May 6, 1952 A. D. NEAL ET AL 2,595,477
MICROMETRIC THICKNESS GAUGE WITH CONTACT PRESSURE INDICATOR
Filed April 30, 1945 2 SHEETS—SHEET 2
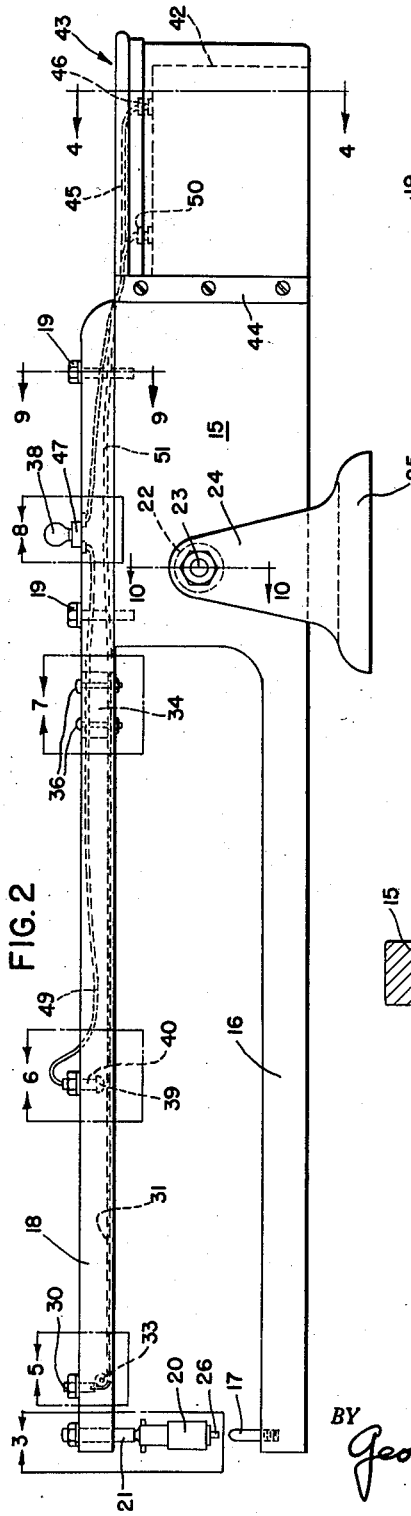
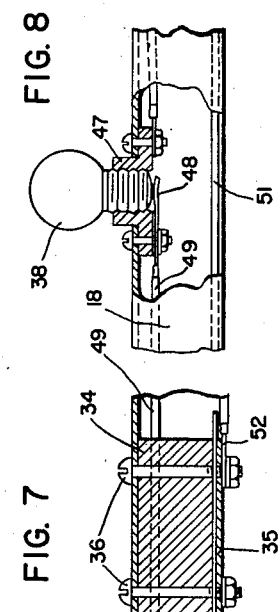
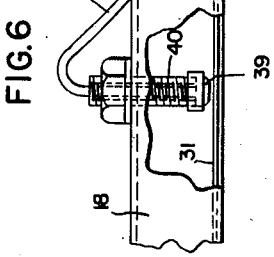
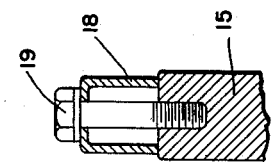
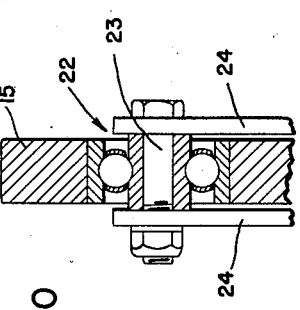
*INVENTOR.*
ADRIAN D. NEAL
HARRISON D. PEET
BY GEORGE J. DELL
*George F. Goodyear*
*ATTORNEY*

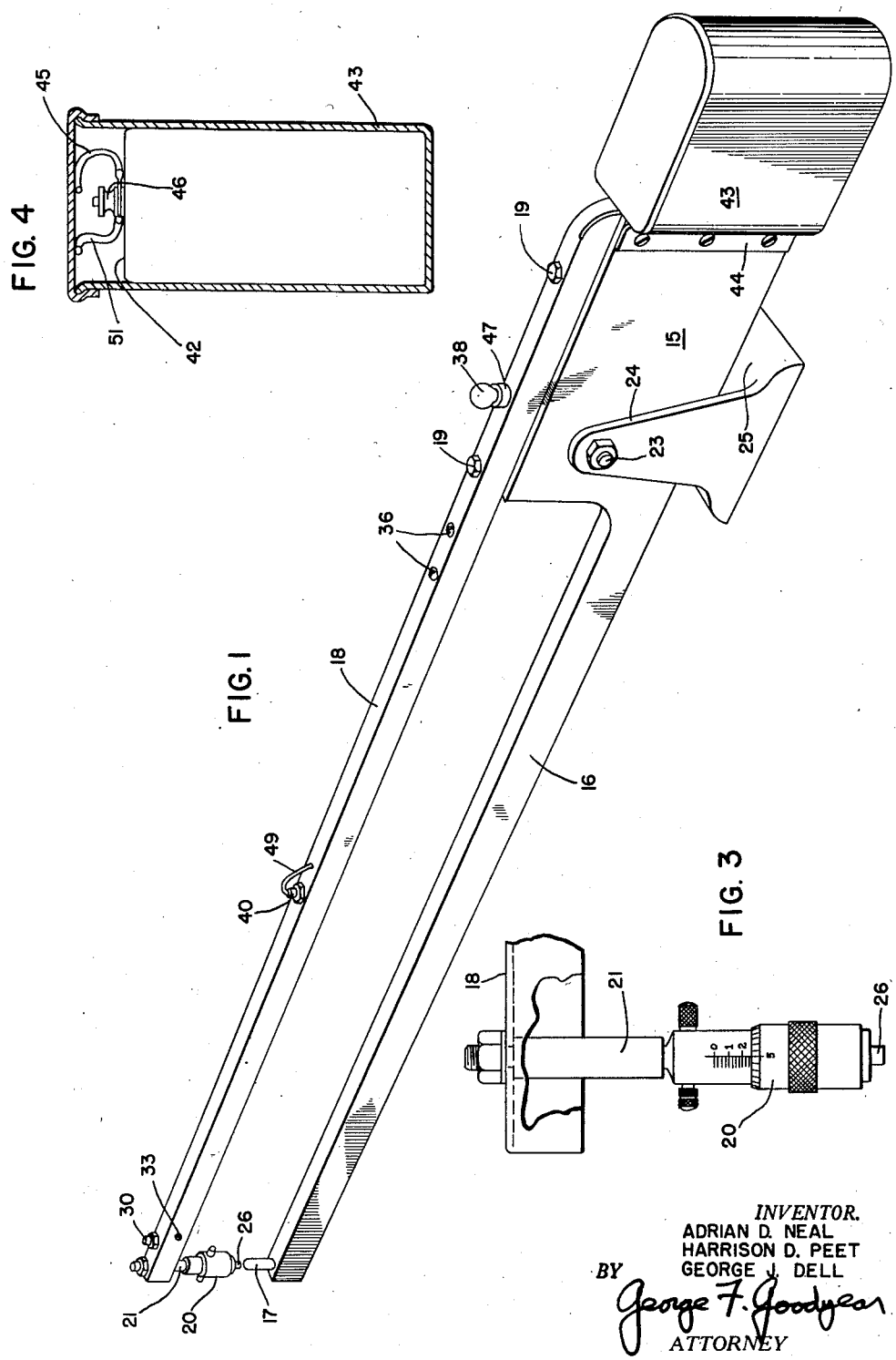

Patented May 6, 1952

2,595,477

UNITED STATES PATENT OFFICE 2,595,477

MICROMETRIC THICKNESS GAUGE WITH CONTACT PRESSURE INDICATOR

Adrian D. Neal, Harrison D. Peet, and George J. Dell, Louisville, Ky., assignors to Curtiss-Wright Corporation, a corporation of Delaware Application April 30, 1945, Serial No. 591,000

7 Claims. (Cl. 33—164)

The present invention is concerned with novel improvements in measuring instruments of the micrometer-caliper type utilized for gauging the thickness of tube walls or other objects.

One of the primary aims hereof is to construct and arrange an instrument of the general type noted for use as a thickness gauge in determining wall thickness of elongated bodies such as tubes and the like where ordinary instruments may not be used.

In carrying out the primary aim it is a further aim to provide the instrument with an elongated feeler means and a cooperating gauging means which are related and cooperate for the purpose in view.

Since the present instrument is best adapted for gauging material where one part of the instrument is likely to be obscured or hidden from view it is an important object to provide means whereby the above noted feeler and gauging means are properly and accurately coordinated.

These, as well as additional aims and objects, will be more fully noted in connection with the description of a preferred embodiment of the invention illustrated in the accompanying drawing, in which:

Figure 1 is an assembly view in perspective of the gauging instrument which forms the subject of this invention, Figure 2 is a side view, in elevation of the same, Figure 3 is a fragmentary detail view taken at zone 3 of Figure 2 and showing the gauging unit and its mount arrangement, Figure 4 is a transverse sectional elevation of the battery unit and housing taken at line 4—4 in Figure 2, Figure 5 is a fragmentary longitudinal detail taken at zone 5 in Figure 2 and showing a part of the electrical means herein preferred, Figure 6 is also a fragmentary longitudinal detail of the electrical pickup element utilized herein and as shown at zone 6 in Figure 2, Figure 7 is another fragmentary longitudinal detail, partly in section, of an anchor block as seen at zone 7 in Figure 2, Figure 8 is still another fragmentary detail, partly in longitudinal sectional elevation, of the electrical indicator means or lamp, the detail being taken at zone 8 of Figure 2, Figure 9 is a partial transverse detail, in section, of the method for securing the gauging support member in position, the section being taken at line 9—9 of Figure 2, and Figure 10 is a fragmentary sectional detail of the main pivot bearing for the instrument as seen at line 10—10 in Figure 2.

The present instrument is illustrated in Figures 1 and 2 as comprising a body member 15 having an elongated and integral feeler arm in the form of a rectangular bar 16, extending therefrom and carrying at its outer free end a transversely positioned anvil or feeler pin 17. A second and similarly elongated gauging arm 18 is secured to the body 15 in position to overlie and be parallel to the arm element 16. The gauging arm 18 is in the form of a channel structure and is suitably secured to the body 15 by bolts 19 as indicated in Figure 9 so that the open side is facing the feeler arm 16. The outer free end of the arm 18 carries a micrometer unit 20 for cooperation with the pin 17 in carrying out gauging or thickness measurements of an object disposed between them. The unit 20 is securely mounted to the element 18 through its threaded connection with an adapter or mounting post 21 secured thereto as clearly shown in Figure 3.

The measuring instrument just described is suitably mounted for pivotal movement about an anti-friction bearing 22 disposed in the body 15 and supported on a shaft element 23 extending between the spaced arm members 24 of a pedestal base structure 25 (see Figures 1, 2 and 10).

Since this instrument is intended for use in determining the wall thickness of tubular objects at generally inaccessible zones along the length thereof, or at zones not easily reached by presently available instruments, the cooperating and substantially parallel elements 16 and 18 are suitably elongated so that the feeler pin 17 and the micrometer unit 20 may be positioned at the wall zone to be measured or gauged for thickness. The length of each of these elements may vary of course but as the length increases the accuracy of the measurement taken therebetween will generally decrease unless precautions are taken to correct for or obviate such effects as deflection of each of the elements due to its own weight or to the weight of the part being gauged or a combination of both. It is preferred that the arm 16 be as rigid as possible or free of excessive deflection tendencies commensurate with its length for reaching the remote inner wall surfaces of objects; whereas, the channel shaped arm 18 may be somewhat more flexible for a purpose later appearing. Further precautions to be taken include some means for determining the surface contact pressure of the feeler pin 17 and micrometer unit 20 so that the final result will be a true measure of the wall thickness of the object.

Accordingly, the above described micrometer type gauging instrument is provided with means for indicating the surface contact established by the cooperating pin 17 and micrometer unit 20 in order to inform the user of the instrument at what point in the adjustment of the unit 20 the proper contact pressure has been reached. This indication is made possible by means carried on element 18 and rendered sensitive to such deflections thereof as may be caused by the adjustment of unit 20 to move its feeler pin 26 against the surface of a body adjacent thereto or positioned between the pins 17 and 26.

The indicating means, details of which may be seen in Figures 4 through 8, includes a first anchor post 30, positioned near the micrometer mount 21, for the securement of an electrically charged wire 31. This wire is held by a suitable set screw 32 and is also positioned near the open side of the channel element 18 by a spool post 33. The charged wire 31 extends rearwardly to a second anchor type block means 34 where it is clamped in position by a bolted on clamp pad 35, the latter being so secured by the bolts 36. The wire is placed in tension and hence will maintain a straight line relation while the element 18 is undergoing deflection. Even though deflections of the arm element may be exceedingly small the wire between the spaced anchor means 32 and 34 will become a chord element with respect to the arcuate shape assumed by the arm. Thus the center zone of the wire span will move quite perceptibly with respect to the element 18. This relative movement is utilized to complete an electrical circuit through an indicating lamp 38 by means of a contact element 39 suitably mounted in a tubular holder means 40 also carried on the element 18 at a point intermediate the effective span of the charged wire 31.

The electrical circuit for the above described indicating arrangement includes a source of current as the battery 42 carried in a suitable housing 43 secured at the rear of the body 15 by angle plates 44. A first battery lead 45 from a terminal 46 thereon extends to a connection at the screw base socket 47 for the lamp 38. From a center contact element 48 at the lamp base, a lead wire 49 extends forwardly to the contact 39. The other side of the circuit from the battery terminal 50 includes a lead 51 connected to the wire 31 through a connector 52 and connector strip (not shown) or the same may be a continuation of the charged wire 31 already noted. The circuit is electrically incomplete until contact is made between the wire 31 and contact element 39, at which latter time the lamp 38 will light. It will be understood that the electrical circuit, including wires 45, 49, 31 and 51, the lamp and its socket 47, the wire tensioning means 30, 33, 34, 35, and the contact element 39, is suitably insulated electrically from conductive structural parts of the instrument so that the circuit is closed to cause the lamp to be lighted only when the element 39 contacts the wire 31.

Because of the sensitivity of the present instrument it is preferred that the same be balanced in a horizontal position about the antifriction means 22. To accomplish this the battery 42 may act as a counterpoise by its disposition at the rearward end of the body 15. Furthermore, it may be found necessary to calibrate the instrument to obtain the proper zero setting on the micrometer 20 for the deflection of arm element 16 caused by the weight of a part being gauged. Since the element 16 is intended for insertion in the part or tubular member, the overhanging end of the latter may, through its contact with the feeler pin 17, deflect element 16 sufficiently to make the reading on the unit 20 inaccurate.

Calibration may be accomplished, if desired, by hanging a representative weight near the pin 17 on element 16 followed by manipulation of the unit 20 until its feeler means 26 contacts pin 17 with sufficient pressure to cause deflection of element 16 and consequent electrical contact between contact 39 and wire 31. The contact between feelers 17 and 26 should be varied several times until the point is reached at which the lamp 38 just lights up. At this point a zero micrometer reading is noted. The weight suspended near pin 17 must be representative of that portion of the weight of the part to be measured which will affect the arm element 16 and for changes in parts being so measured the weights must also be changed.

Once a zero calibration has been arrived at, the part to be measured is placed over the element 16 until feeler pin 17 is at the point to be measured. This is followed by micrometer manipulation to bring its feeler means 26 into the proper positive contact such that the lamp 38 just lights up. This is an indication that the correct adjustment has been achieved. A reading of the micrometer indicia, from which must be subtracted the zero calibration reading, will result in a net value which is the desired dimension of the part disposed between the feelers 17 and 26.

It should be apparent now that the present instrument is quite sensitive, will give accurate readings, can be made to accommodate a variety of tubular parts otherwise inaccessible for measurement at internal zones, and is very simply constructed. Certain modifications and rearrangement of parts may also become apparent after a full understanding hereof, but the same should not be construed as departing from the scope of this invention as defined by the claims hereto annexed.

What is claimed is:

1. In a measuring instrument, a body structure, a first elongated arm element mounted on said body, a second elongated arm element mounted on said body so as to be substantially parallel to but spaced from said first arm, fixed anvil positioned near one end of one of said arms, a micrometer unit positioned near one end of the other of said arms for predetermined adjustable cooperation with said fixed anvil in determining the distance therebetween when the same are separated by but in contact with the opposite surfaces of an interposed object, one of said arms being less rigid than the other arm, datum means free from stress supported by said arm, and means responsive to flexing of said arm relative to said datum means for indicating the point at which the micrometer exerts a predetermined contact pressure on said body.

2. In a micrometer-caliper, a body structure, a first arm carried by said body and constructed and arranged as a substantially rigid element for establishing contact with the surface of a body, a second arm carried by said body structure in spaced, parallel relationship with said first arm, a micrometer mounted on said second arm for establishing surface contact pressure with the surface of the body at a point substantially opposite the contact of said first arm with the surface thereof whereby the thickness of said body wall may be ascertained, said second arm being less rigid than said first arm and capable of deflecting movement with respect thereto as said micrometer is operated to vary its contact pressure with the surface of the body, datum means, free from stress, supported by said arm, and means responsive to flexure of said arm relative to said datum means for indicating the point at which the micrometer exerts a predetermined contact pressure on the body.

3. A measuring instrument for use in gauging the wall thickness of elongated tubular bodies and the like, comprising a body having a first arm constituting a substantially rigid element, the body having a second arm in spaced and substantially parallel relationship to the first arm, a micrometer on the end of the second arm arranged to cooperate with an opposed portion of the first arm for measuring the thickness of an interposed wall, a pair of wire supports carried by said second arm at spaced points therealong, a wire extending between said supports in substantially parallel relationship to said second arm, a contact element carried by the second arm at a point between said supports and arranged to engage said wire upon predetermined flexure of said second arm, and electrical indicating means operable by and upon such contact.

4. A measuring instrument for use in gauging the wall thickness of elongated tubular bodies and the like, comprising a base and a body having a pivot connection therewith, said body having first and second arms extending therefrom in spaced and substantially parallel relationship, the first arm being substantially rigid and the second arm relatively flexible, a micrometer on the end of the second arm arranged to cooperate with an opposed portion of the first arm for measuring the thickness of an interposed wall, a pair of wire supports carried by the second arm at spaced points therealong, a wire extending between said supports in substantially parallel relationship to said second arm, a contact element carried by said second arm at a point between said supports and arranged to engage said wire upon predetermined flexure of said second arm, a battery carried by said body on the opposite side of said pivot connection from said arms for counterbalancing the latter, and an electric lamp in electric circuit with said battery, contact and wire.

5. A measuring instrument for use in gauging thickness, comprising a body having a pair of arms in spaced substantially parallel relationship, datum means alongside one of said arms and secured to the instrument, a micrometer adjacent the end of one of said arms arranged to cooperate with an opposed portion of the other arm for measuring the thickness of a member interposed between said arms, one of said arms being less rigid than the other arm, electric contact means mounted on said less rigid arm and on said datum means arranged to open and close an electric circuit upon predetermined flexure of the arm relative to said datum means, and electrically operated indicating means controlled by said contact means.

6. A measuring instrument comprising two substantially parallel arms, means securing said arms together at their one ends, said arms in virtue of their length being flexibly yieldable, anvils at the free ends of said arms between which a workpiece may be placed for gaging, one of said anvils being adjustable to engage the workpiece and to exert pressure thereon to cause stressing and bending of said arms, an elongated datum member supported by one of said arms at spaced-apart points thereon and isolated from bending with said arm, means substantially centrally disposed between points on said arm engageable with the datum member when the arm is bent a predetermined amount on account of pressure exerted by said anvils, and indicating means actuated by engagement of said centrally disposed means with said datum member.

7. In a micrometer gage comprising a U-shaped assembly wherein the arms are long and slender, one arm carrying at its end a work-engaging anvil, the other arm carrying a work-engaging adjustable micrometer element, said arms being elastic and thereby being sensitive in their deflection to gaging pressure between said anvil and micrometer element, means to maintain consistency in gaging pressure comprising an elongated uniformly stressed reference member extending along one said arm and secured thereto near the ends thereof, whereby said arm under the influence of gaging pressure distorts and moves relative to said reference member, contacts on said arm and reference member, normally separated but engageable with one another after a certain deflection of said arm due to gaging pressure, and indicating means actuated by engagement of said contacts.

ADRIAN D. NEAL.
HARRISON D. PEET.
GEORGE J. DELL.

REFERENCES CITED

The following references are of record in the file of this patent:

UNITED STATES PATENTS

| Number | Name | Date |
| --- | --- | --- |
| 1,356,214 | Metzger | Oct. 19, 1920 |
| 1,648,895 | Gerdien | Nov. 15, 1927 |
| 2,099,896 | Kinzel | Nov. 23, 1937 |
| 2,180,176 | Stone | Nov. 14, 1939 |
| 2,217,509 | Bryant | Oct. 8, 1940 |
| 2,316,975 | Ruge | Apr. 20, 1943 |
| 2,322,319 | Ruge | June 22, 1943 |
| 2,417,148 | Wright | Mar. 11, 1947 |

FOREIGN PATENTS

| Number | Country | Date |
| --- | --- | --- |
| 7,910 | Austria | June 10, 1902 |
| 104,053 | Great Britain | Feb. 22, 1917 |
| 524,015 | France | May 6, 1921 |
| 538,866 | Germany | Nov. 26, 1931 |